United States Patent
Chan et al.

(10) Patent No.: US 9,215,020 B2
(45) Date of Patent: Dec. 15, 2015

(54) SYSTEMS AND METHODS FOR PROVIDING PERSONALIZED AUDIO CONTENT

(71) Applicant: Elwha LLC, Bellevue, WA (US)

(72) Inventors: Alistair K. Chan, Bainbridge Island, WA (US); Paul Holman, Seattle, WA (US); Roderick A. Hyde, Redmond, WA (US); Nathan P. Myhrvold, Bellevue, WA (US); Keith David Rosema, Olympia, WA (US); Neal Stephenson, Seattle, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 484 days.

(21) Appl. No.: 13/621,721

(22) Filed: Sep. 17, 2012

(65) Prior Publication Data
US 2014/0079241 A1 Mar. 20, 2014

(51) Int. Cl.
*H04B 3/00* (2006.01)
*H04H 20/86* (2008.01)
*H04W 4/20* (2009.01)
*H04N 21/81* (2011.01)
*H04L 29/08* (2006.01)
*H04W 4/02* (2009.01)
*H04N 21/43* (2011.01)

(52) U.S. Cl.
CPC .......... *H04H 20/86* (2013.01); *H04N 21/8106* (2013.01); *H04W 4/206* (2013.01); *H04L 67/30* (2013.01); *H04N 21/4307* (2013.01); *H04W 4/02* (2013.01)

(58) Field of Classification Search
None
See application file for complete search history.

(56) References Cited

U.S. PATENT DOCUMENTS

| | | |
|---|---|---|
| 5,055,939 A | 10/1991 | Karamon et al. |
| 5,459,790 A | 10/1995 | Scofield et al. |
| 5,661,812 A | 8/1997 | Scofield et al. |
| 5,841,879 A | 11/1998 | Scofield et al. |
| 6,144,747 A | 11/2000 | Scofield et al. |
| 6,311,155 B1 | 10/2001 | Vaudrey et al. |
| 6,483,568 B1 | 11/2002 | Folio |
| 6,853,732 B2 | 2/2005 | Scofield |
| 6,912,501 B2 | 6/2005 | Vaudrey et al. |
| 6,987,947 B2 | 1/2006 | Richenstein et al. |
| 7,076,204 B2 | 7/2006 | Richenstein et al. |
| 7,233,769 B2 | 6/2007 | Richenstein et al. |
| 7,337,111 B2 | 2/2008 | Vaudrey et al. |
| 7,359,671 B2 | 4/2008 | Richenstein et al. |
| 7,603,080 B2 | 10/2009 | Richenstein et al. |
| 2003/0002689 A1 | 1/2003 | Folio |
| 2004/0120688 A1 | 6/2004 | Poltorak |
| 2005/0248717 A1 | 11/2005 | Howell et al. |

(Continued)

OTHER PUBLICATIONS

PCT International Search Report; International App. No. PCT/US2013/059952; Dec. 31, 2013; pp. 1-4.

*Primary Examiner* — Regina N Holder
(74) *Attorney, Agent, or Firm* — Foley & Lardner LLP (57) ABSTRACT

A method for providing audio content to a user device in a movie theater includes the steps of personalizing the audio content for the user device based on an identifier and providing the personalized audio content to the user device. In some embodiments, the identifier is based on demographic information about the user. According to some embodiments, the personalized audio content accompanies additional content that is not provided by the user device. In some embodiments, the personalized audio content accompanies a movie.

45 Claims, 4 Drawing Sheets

(56) References Cited

U.S. PATENT DOCUMENTS

| | | |
|---|---|---|
| 2006/0025206 A1 | 2/2006 | Walker et al. |
| 2006/0045294 A1 | 3/2006 | Smyth |
| 2006/0132382 A1 | 6/2006 | Jannard |
| 2007/0242834 A1 | 10/2007 | Coutinho et al. |
| 2007/0270988 A1 | 11/2007 | Goldstein et al. |
| 2007/0297624 A1 | 12/2007 | Gilman |
| 2008/0004953 A1 | 1/2008 | Ma et al. |
| 2008/0130924 A1 | 6/2008 | Vaudrey et al. |
| 2008/0219637 A1 | 9/2008 | Sandrew |
| 2008/0219641 A1 | 9/2008 | Sandrew et al. |
| 2008/0318518 A1 | 12/2008 | Coutinho et al. |
| 2011/0028213 A1 | 2/2011 | Dusenberry et al. |
| 2011/0061108 A1 | 3/2011 | Arrasvuori et al. |
| 2012/0095749 A1 | 4/2012 | Capretta |
| 2012/0173995 A1* | 7/2012 | Alameh et al. ............... 715/761 |

* cited by examiner

FIG. 3

SYSTEMS AND METHODS FOR PROVIDING PERSONALIZED AUDIO CONTENT

BACKGROUND

The present application relates generally to providing audio content and, in particular, to providing personalized audio content to individual members of a group of people. People gather together to watch movies, attend sporting events, listen to lectures, and so forth. Generally, the audio content (e.g., in a movie theater) is provided to the group as a whole so that individuals in the group (e.g., those watching the movie) all listen to the same content.

SUMMARY

In one exemplary embodiment, a method for providing audio content to a user device in a movie theater includes the steps of personalizing the audio content for the user device, based on an identifier and providing the personalized audio content to the user device.

In another exemplary embodiment, a system for providing audio content to a user device in a movie theater includes a content personalizer having a processor configured to personalize the audio content for the user device based on an identifier and provide the personalized audio content to the user device.

Another exemplary embodiment includes a tangible computer-readable storage medium having instructions encoded thereon. The instructions when processed by a processing circuit perform steps including personalizing audio content for a user device, based on an identifier and providing the personalized audio content to the user device.

According to another exemplary embodiment, a computing device for providing audio content to a user device in a movie theater includes a processor configured to personalize the audio content for the user device based on an identifier and provide the personalized audio content to the user device.

Another exemplary embodiment relates to a user device for receiving audio content in a movie theater from a computing device. The user device includes a processor configured to transmit an identifier to the computing device and receive personalized audio content from the computing device based on an identifier.

The invention is capable of other embodiments and of being practiced or being carried out in various ways. Alternative exemplary embodiments relate to other features and combinations of features as may be generally recited in the claims.

DETAILED DESCRIPTION

The methods, systems, and tangible, computer-readable storage media described herein provide a way of providing audio content to a user of a device having an audio output. In some embodiments, enhanced audio, tailored to a user or a user's location, may be provided to a set of earbuds or other listening device. For instance, a user may be watching a movie in a movie theater, while listening to additional or alternative audio content provided through a listening device. Many users own earbuds and wear them or carry them routinely, so it may be convenient for users to plug in their own earbuds (or a purchased or rented listening device) to a system that provides personalized audio content.

Such methods may be carried out on a system including circuitry to personalize and deliver audio content to a user, for example, through a headset, headphones, one or more earbuds, stereo speaker(s), surround-sound speaker(s), speaker array(s), computer speaker(s) or other speaker(s) integrated with or connected to one or more devices, or otherwise through one or more speakers, or any combination of those. The speakers may be capable of producing three-dimensional audio effects beyond left channel and right channel. The speaker may be connected to the system wirelessly or through a wired connection, or the system may be a single standalone device.

The system may include a computer system, which may include one or more integrated circuits or other processors that may be programmable or special-purpose devices. The system may include memory which may be one or more sets of memory, which may be persistent or non-persistent, such as dynamic or static random-access memories, flash memories, electronically-erasable programmable memories, or the like, having instructions embedded therein, such that if executed by a programmable device, the instructions will carry out methods as described herein to form systems and devices having functions as described herein.

Figure 1:
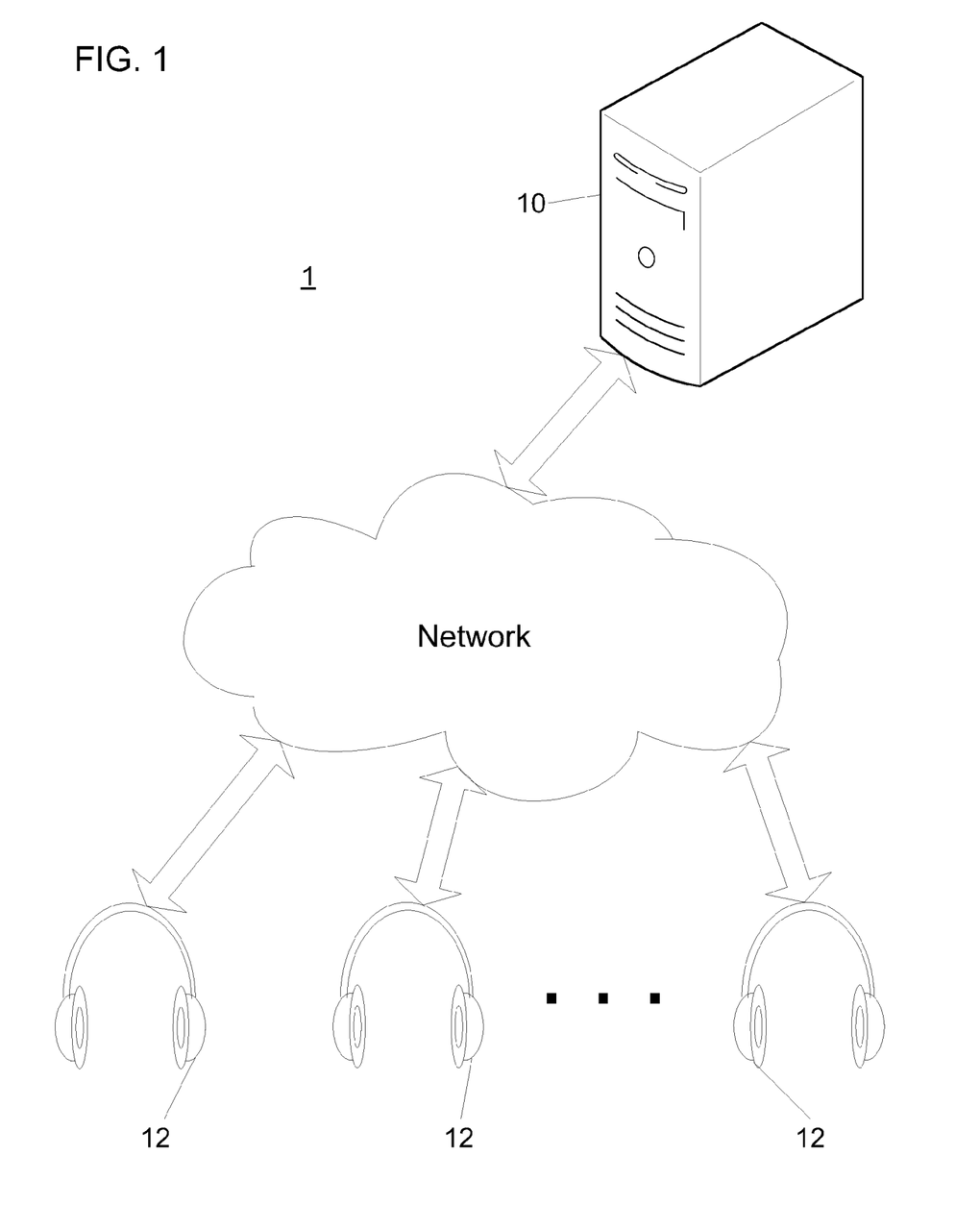
FIG. 1 is a schematic diagram of a system, according to an exemplary embodiment.

FIG. 1 illustrates a system according to an exemplary embodiment. As shown in FIG. 1, an exemplary networked system 1 for implementing processes according to embodiments of the invention may include, but is not limited to, a general-purpose computing device 10 that interacts with users through a network, such as, but not limited to, a wireless network. Computing device 10 may be a server that communicates over a network with one or more user devices 12. Computing device 10 may include, but is not limited to, one or more of: a general-purpose computer, special-purpose computer, mainframe, tablet computer, smartphone, PDA, Bluetooth device, and the like, including any device that is capable of providing audio to user device 12.

User device 12 may communicate with one or more computing devices 10 through a network. User device 12 may be a mobile device connected to or include one or more speakers. User device 12 may include, but is not limited to, one of more of: a general-purpose computer, special-purpose computer, mainframe, tablet computer, smartphone, PDA, Bluetooth device, media player device, radio receiver or other receiver device, a seat providing a port for plugging in headphones or another listening device, headphones, and the like, including any device that is capable of providing audio to a user through a speaker which may or may not be attached to user device 12. User device 12 may communicate with one or more servers 10 through one or more applications that include computer-executable instructions. Alternative embodiments may not involve a network at all, and may instead be implemented on a standalone device for use by at least one user.

Computing device 10 may be implemented as a network of computer processors. In some implementations, computing device 10 may be multiple servers, mainframe computers, networked computers, a processor-based device, or a similar type of system or device. In some implementations, computing device 10 may be a server farm or data center. Computing device 10 may receive connections through a load-balancing server or servers. In some implementations, a task may be divided among multiple computing devices 10 that are working together cooperatively.

Figure 2:
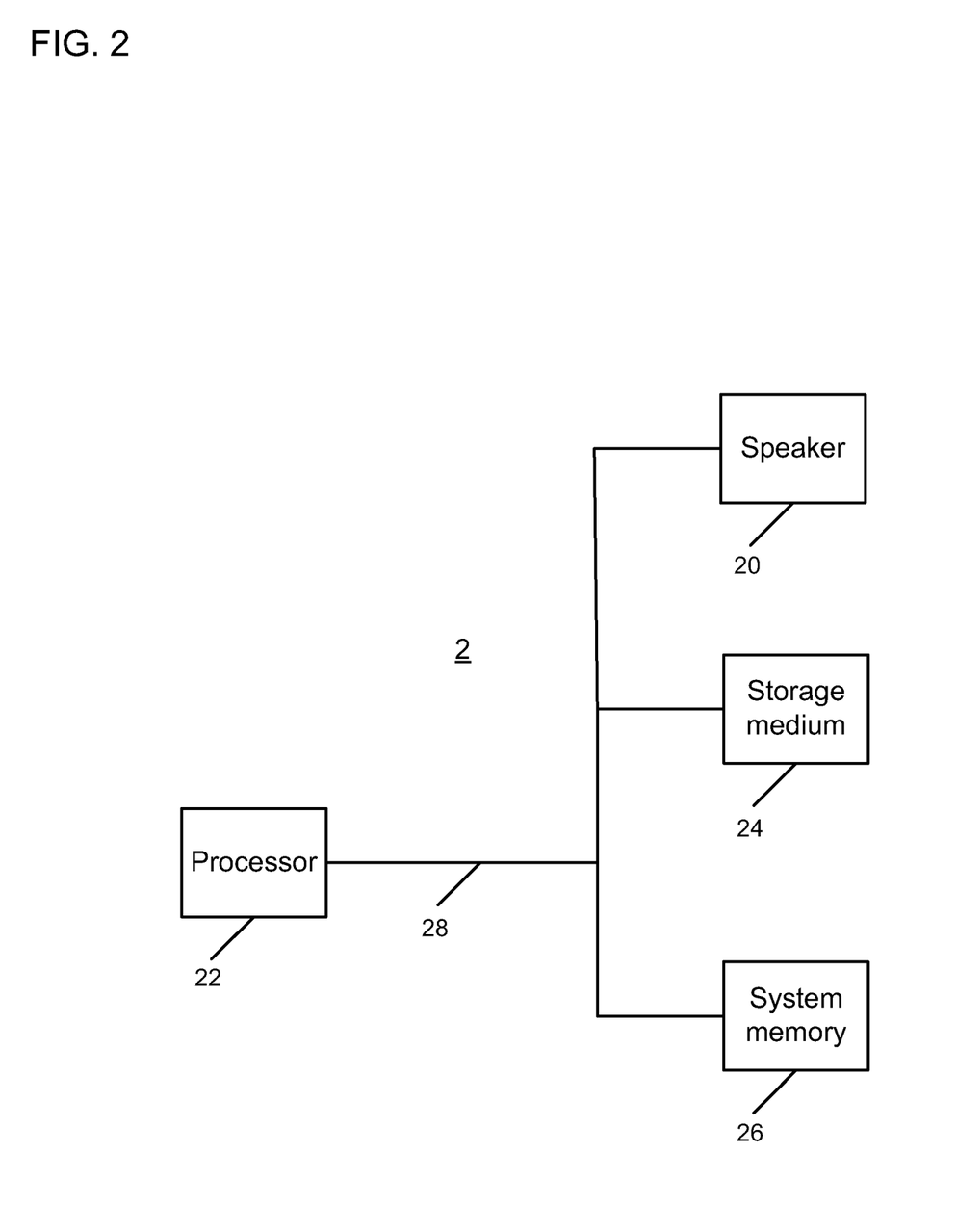
FIG. 2 illustrates a computer system for implementing a method of providing audio content to a user of a user device, according to an exemplary embodiment.

FIG. 2 illustrates a system according to some embodiments of the present invention. As shown in FIG. 2, an exemplary system 2 for implementing the method(s) discussed include (but is not limited to) a general-purpose computing device in the form of a conventional computer, including a processing unit 22 or processor, a system memory 26, and a system bus 28 that couples various system components including the system memory 26 to the processing unit 22.

The system 2 may also include one or more audio speakers 20, which may be external or internal to user device 12. For example, as discussed above in regard to FIG. 1, the speaker(s) 20 may be part of a user device 12 that is separate from computing device 10. Alternatively, the user device 12 and computing device 10 may be a single standalone device.

The system memory 26 may include one or more suitable memory devices such as, but not limited to, random access memory (RAM). The computer may include a storage medium 24, such as, but not limited to, a solid state storage device and/or a magnetic hard disk drive (HDD) for reading from and writing to a magnetic hard disk, a magnetic disk drive for reading from or writing to a removable magnetic disk, and an optical disk drive for reading from or writing to removable optical disk such as a CD-RW or other optical media, flash memory, etc. A storage medium 24 may be external to the computer, such as external drive(s), external server(s) containing database(s), or the like. The drives and their associated computer-readable media may provide non-transient, non-volatile storage of computer-executable instructions, data structures, program modules, and other data for the computer to function in the manner described herein. Various embodiments employing software are accomplished with standard programming techniques.

User device 12 and computing device 10 may each separately include processor(s) 22, storage medium or media 24, system memory 26, and system bus(es) 28. Alternatively, the user device 12 may not itself be a computing device 22, 24, 26, 28, but may instead be a speaker device 12 with circuitry for facilitating play of audio. In yet another embodiment, user device 12 and computing device 10 may be the same computing device, such that there is just one set of processor(s) 22, storage medium(s) 24, system memory(ies) 26, or system bus(es) 28 that are shared between them.

According to various embodiments, computer-executable instructions may encode a process of securely sharing access to information. The instructions may be executable as a standalone, computer-executable program, as multiple programs, as mobile application software, may be executable as a script that is executable by another program, or the like.

Figure 3:
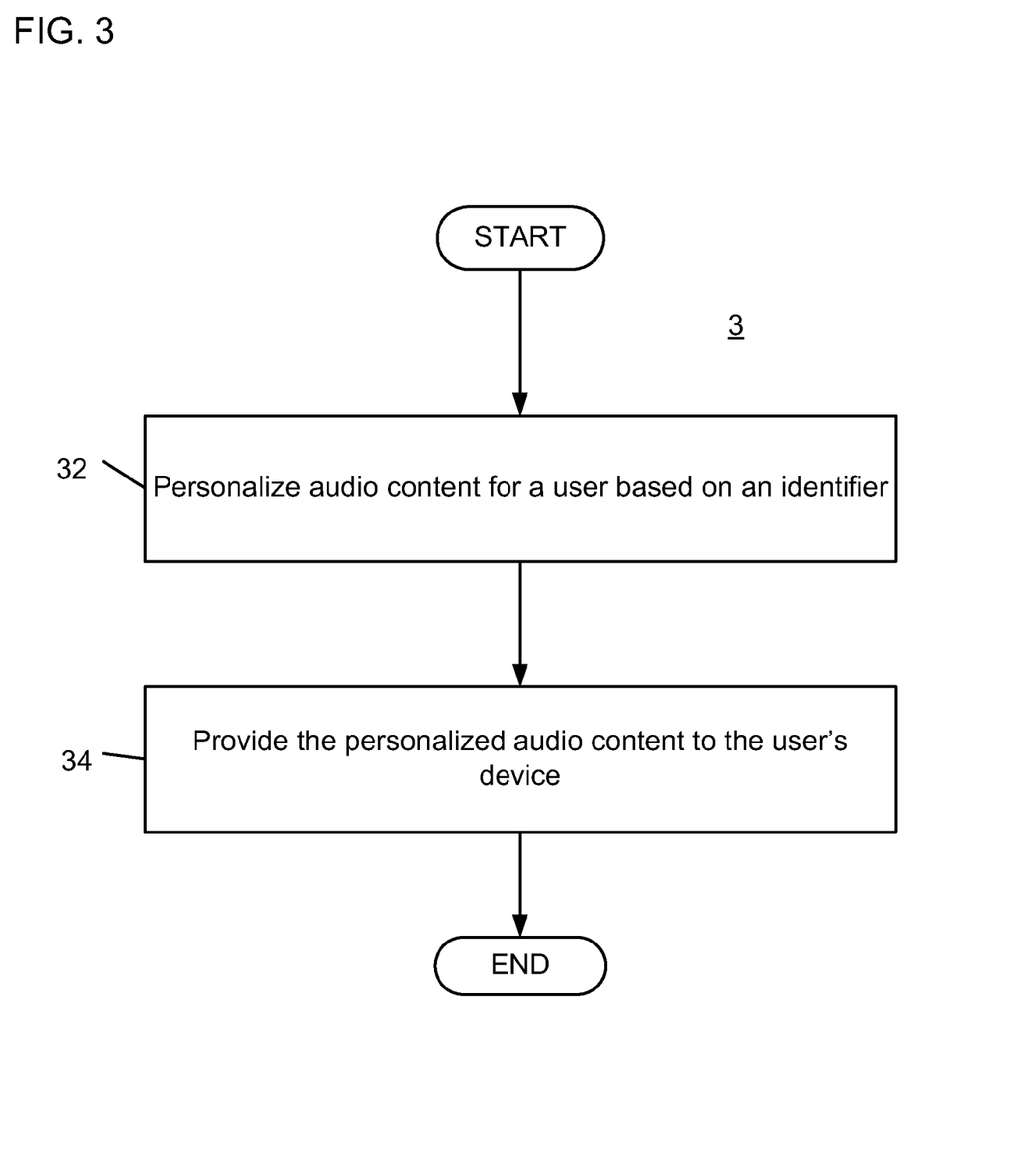
FIG. 3 is a flowchart of a method according to an exemplary embodiment.

With reference to FIG. 3, a method of providing audio content to a user through a user device according to various embodiments is implemented by a computer system 2 according to a process 3. A processor 22 may execute instructions that instruct information to be saved to a storage medium 24.

Audio content is personalized for a user based on one or more identifiers (step 32). The identifier(s) may be transmitted from one or more user devices 12 and received by one or more servers 10. The identifier may already be known to computing device 10 as being associated with user device(s) 12 without the identifier being transmitted or received between computing device 10 and user device 12. The identifier may be information that uniquely identifies user device 12, a user, or a group of user devices 12 or users. Alternatively, the identifier may not be a unique identifier. The identifier may be based on demographic information about one or more users.

The identifier may be based on a location of user device 12. For example, a location may be based at least in part on which seat a user is sitting in, out of a group of seats. A location may be relative to speakers in the room. A location may be outside of the room displaying the movie; for instance it can be in a lavatory, at a concession stand, or in a hallway between movie rooms. The location may be determined by a location sensor within the user device 12, or by an external location system which determines the location of user device 12. The location device may utilize the global positioning system, a ground-based positioning system, a theater based positioning system, accelerometers or other inertial sensors, beacons using electromagnetic or ultrasound waves, magnetic sensors, or other methods.

The identifier may be based on a ticket, receipt, order, purchase, or the like. For example, the ticket, receipt, order, or purchase may be associated with a ticket number, receipt number, order number, or purchase number (or the like) that is used as an identifier.

The identifier may be based on a user account. For instance, a user may have a grocery store card, a frequent flier card, a movie theater card, or the like, which is associated with a user account. Information identifying the user account may be used as the identifier. The user account may store one or more user preferences, which are then associated with the identifier to affect the personalization of audio content.

The identifier may be based on input from a user. The input may be related to a user account. Alternatively, input may be related to information about interests, features, religious affiliations, or other information about the user, such as the user's demographics. This input may, for example, be received by user device 12 or computing device 10.

Information may be stored about one or more users or user devices 12 in a database. The database may be stored on the computing device 10 or external to computing device 10. The database may maintain a history related to users or user devices 12. The database may be used to help determine one or more identifiers. The database may maintain a history related to user preferences, system usage, or past purchases.

The identifier may be associated with user device 12. For example, user device 12 may have an IP address, MAC address, serial number, identity, or the like associated with it. As another example, software, a data file, or the like, may exist on user device 12 that includes the identifier, an identity, or information that leads to the determination of the identifier. User device 12 may transmit the identifier or information that leads to its determination, and computing device 10 may receive the transmission.

The identifier may be determined based on facial recognition. For example, a camera or other sensor may capture an image of a user. Alternatively, an image may be provided. The facial recognition may uniquely identify a user, identify the group of a user, or identify demographics regarding a user. For instance, the user's age, sex, race, or the like, may be determined. Audio content may be personalized based on this information.

Further referring to FIG. 3, the personalized audio content is provided to the user device(s) 12 (step 34). Personalized audio content received by one user device 12 may be different from personalized audio content received by a different user device 12. Groups of user device(s) 12 may receive the same personalized audio content, but different personalized audio content from that of a different group of user device(s) 12. In an embodiment, a user may be a member of a social network, in which co-members or 'friends' can share audio commentary about segments of the movie. The identifier may identify the user as a member of the social network. The audio commentary for a specific scene can be embargoed from a user until the arrival of the scene and then delivered (just before, during, or just afterwards based on user preferences) via user device 12 to the user. The delayed delivery permits the audio commentary to be aligned with the video portion of the movie.

In some embodiments, the user may temporarily leave his or her seating position within the room displaying the movie, for instance to visit a lavatory or a concession stand. During this absence, user device 12 may provide the user with the movie soundtrack so that the user will not miss audio information during the absence. In a related embodiment, user device 12 may provide the user with an audio synopsis of movie information that was missed during a temporary absence.

Sound effects may be provided to the user device 12. For instance, a user that is not provided the personalized audio content may hear one sound effect, while a user that is provided the personalized audio content may hear a different, enhanced sound effect.

The personalized audio content may differ, depending on the type of the user device 12. For example, different types of user devices 12 may have different capabilities, and thus the user device 12 with a greater capability may receive content that requires that capability.

Alternative music or additional music may be provided to the user device 12. Specialized sound tracks may be provided.

Alternative dialogue or additional dialogue may be provided to the user device 12. For instance, dialogue may be provided in a different language. This may be a translation of the original dialogue. As another example, a redacted or "clean" version may be provided that removes or replaces offensive audio with an alternative sound. This is useful for providing children or adults with the clean version while adults are provided the original or explicit version. This is also useful in replacing language offensive to some users' religious beliefs with less offensive material.

Different groups of user device(s) 12 may be provided different audio content. For example, user devices 12 for one group may be provided audio related to a sporting event, while user devices 12 of another group may be provided audio for a movie, allowing the members of both groups to attend the same movie while enjoying different content.

Provided audio content may include individualized advertising, which may include one or more offers or one or more promotions. For instance, one user device 12 may be provided audio reminding the user that refreshments are available for sale, while another user device 12 may be provided audio that contains different or no advertisements. The advertisements or offers may be related to something (e.g., merchandise or services) that can be purchased in the movie theater, or that has already been purchased. For instance, the system may keep track of data related to food or beverages that the user has previously purchased at a concession stand (during this visit, or a previous one known to the system), and may offer the user suggestions of additional food or beverages. The advertisements or offers may be related to something that the user can see on the movie screen.

In some embodiments, an incentive may be provided to encourage the user to agree to receive individualized advertising. For example, the user may receive a discount on the user's movie ticket in exchange for listening to advertising. The user device 12 may receive audio in a store setting, such as a grocery store. For instance, the provided audio may include information about deals available in the store.

According to some embodiments, the user may be required to pay (e.g., with a credit account) an additional amount for personalized audio content. In other embodiments, the user may receive personalized audio content for free or free with purchase, such as the purchase of a movie ticket.

In some embodiments, the audio may be differential, such that the main sound system plays sound using one frequency or a set of frequencies, while the user's listening device plays sound to the user using a different frequency or frequencies. In some embodiments, this differential audio may use the same or different frequencies in order to offset location-dependent variations in a theater's external soundtrack, so as to provide location-independent sound effects.

The provided audio may include three-dimensional audio effects. For example, the three-dimensional audio effects may include placement of sound(s) outside a stereo basis, modified phase information that may widen a stereo image, complete three-dimensional positional audio, or any combination of those and stereo effects. The three-dimensional audio effect may be dependent on the location of the user device within the room.

Figure 4:
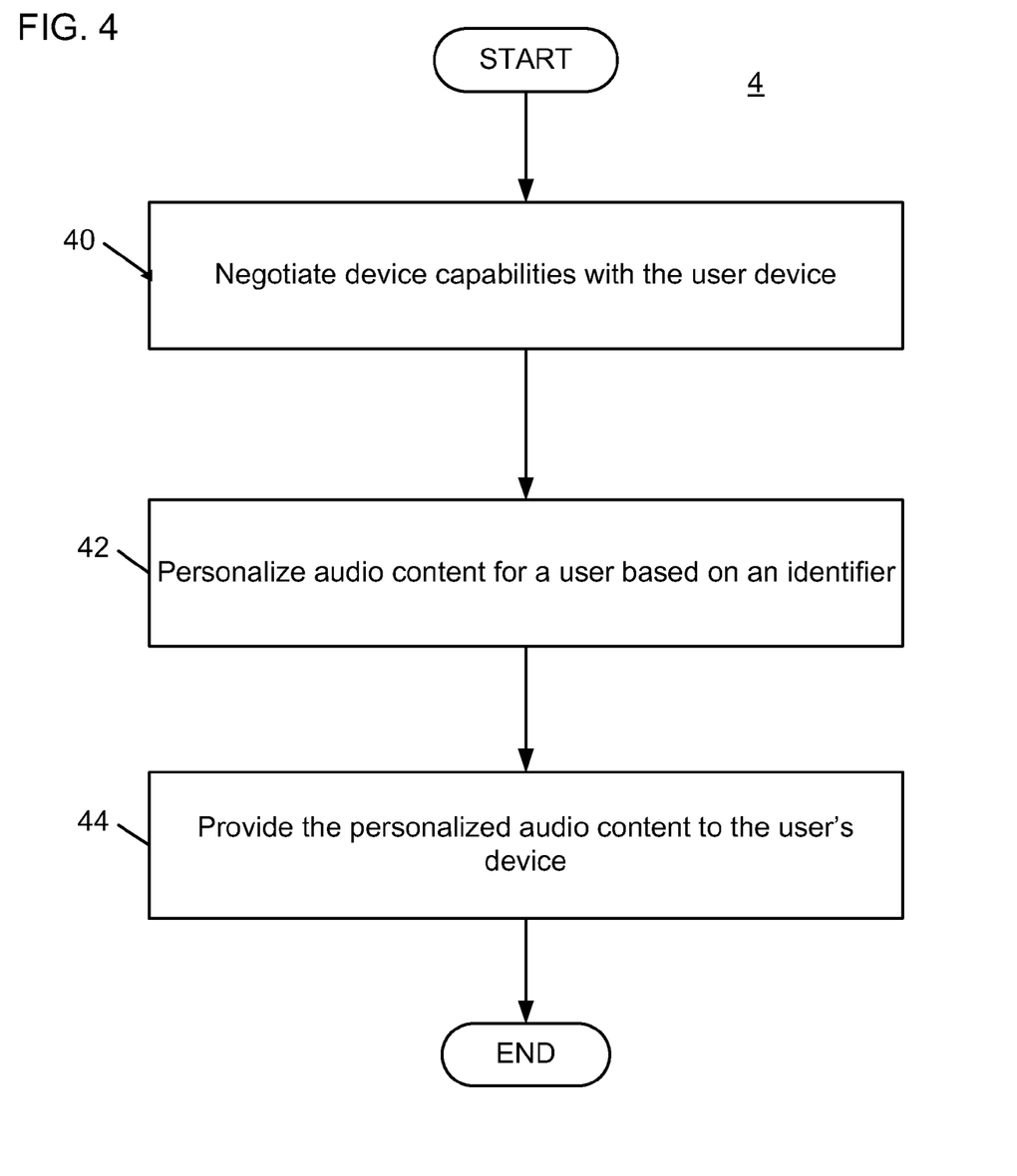
FIG. 4 is a flowchart of a method according to an exemplary embodiment, wherein the device capabilities are negotiated.

With reference to FIG. 4, a method of providing audio content to a user through a user device according to various embodiments is implemented by a computer system 2 according to a process 4.

First, a server negotiates device capabilities with a user device (step 40). For example, computing device 10 may receive from user device 12 frequency information. This frequency information may include information about a frequency or frequencies that user device 12 requests computing device 10 use for transmissions to the user device 12. Step 42 of process 4 is described above as step 32 of process 3. Step 44 of process 4 is described above as step 34 of process 3.

In another example, the user device 12 may notify computing device 10 that the user wishes to opt in or out of an option. The option may include, for example, whether to permit or ban the release of information. In some embodiments, an indicator may be received from the user to indicate whether to opt in or out of an option. A code word may be received from the user, and the code word indicates whether the user opts in or out of the option. For example, a code word such as the words "yes" or "no" may be received indicating whether to send personalized audio to the user device 12. In some embodiments, the personalized audio content may be provided automatically to the user device 12.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein.

The above-described embodiments may be implemented using hardware, software or a combination thereof. When implemented in software, the software code may be executed on any suitable processor or collection of processors, whether provided in a single computer system ("computer") or distributed among multiple computers.

Further, it should be appreciated that a computer may be embodied in any of a number of forms, such as a rack-mounted computer, a desktop computer, a laptop computer, a server computer, a cloud-based computing environment, a tablet computer, etc. Additionally, a computer may be embedded in a device not generally regarded as a computer but with suitable processing capabilities, including a Personal Digital Assistant (PDA), a smart phone, or any other suitable portable or fixed electronic device.

Various embodiments may include hardware devices, as well as program products including computer-readable, non-transient storage media for carrying or having data or data structures stored thereon for carrying out processes as described herein. Such non-transient media may be any available media that can be accessed by a general-purpose or special-purpose computer or server. By way of example, such non-transient storage media may include random-access memory (RAM), read-only memory (ROM), erasable programmable read-only memory (EPROM), electrically erasable programmable read-only memory (EEPROM), field programmable gate array (FPGA), flash memory, compact disk, or other optical disk storage, magnetic disk storage or other magnetic storage devices, or any other medium which can be used to carry or store desired program code in the form of computer-executable instructions or data structures and which can be accessed by a general-purpose or special-purpose computer. Combinations of the above may also be included within the scope of non-transient media. Volatile computer memory, non-volatile computer memory, and combinations of volatile and non-volatile computer memory may also be included within the scope of non-transient storage media. Computer-executable instructions may include, for example, instructions and data that cause a general-purpose computer, special-purpose computer, or special-purpose processing device to perform a certain function or group of functions.

In addition to a system, various embodiments are described in the general context of methods and/or processes, which may be implemented in some embodiments by a program product including computer-executable instructions, such as program code. These instructions may be executed by computers in networked environments. The terms "method" and "process" are synonymous unless otherwise noted. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

In some embodiments, the method(s) and/or system(s) discussed throughout may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments may encompass many types of computer system configurations, including personal computers, hand-held devices, multi-processor systems, microprocessor-based or programmable consumer electronics, network personal computers, minicomputers, mainframe computers, and the like.

In some embodiments, the method(s) and/or system(s) discussed throughout may be operated in distributed computing environments in which tasks are performed by local and remote processing devices that may be linked (such as by wired links, wireless links, or by a combination of wired or wireless links) through a communications network. Specifically, computing device 10 and user device 12 may communicate wirelessly or through wired connection(s). Communication may take place using a Bluetooth standard or the like.

In a distributed computing environment, according to some embodiments, program modules may be located in both local and remote memory storage devices. Data may be stored either in repositories and synchronized with a central warehouse optimized for queries and/or for reporting, or stored centrally in a database (e.g., dual use database) and/or the like.

The various methods or processes outlined herein may be coded and executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. The computer-executable code may include code from any suitable computer programming or scripting language or may be compiled from any suitable computer-programming language, such as, but not limited to, ActionScript, C, C++, C#, Go, HTML, Java, JavaScript, JavaScript Flash, JSON, Objective-C, Perl, PHP, Python, Ruby, Visual Basic, and XML.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above. The recitation of a module, logic, unit, or circuit configured to perform a function includes discrete electronic and/or programmed microprocessor portions configured to carry out the functions. For example, different modules or unit that perform functions may be embodied as portions of memory and/or a microprocessor programmed to perform the functions.

Additionally, it should be appreciated that according to one aspect, one or more computer programs that, when executed, perform methods of the present invention, need not reside on a single computer or processor, but may be distributed in a modular fashion amongst a number of different computers or processors to implement various aspects of the present invention.

The indefinite articles "a" and "an," as used herein in the specification and in the claims, unless clearly indicated to the contrary, should be understood to mean "at least one."

Although the foregoing is described in reference to specific embodiments, it is not intended to be limiting or disclaim subject matter. For example, many of the examples provided herein relate to providing personalized audio content to people in a movie theater. However, the concepts are also applicable to other venues, such as sporting events, worship services, classrooms, etc. Rather than being limited to specific embodiments, the invention as described herein is defined by the following claims, and any that may be added through additional applications. The inventors intend no disclaimer or other limitation of rights by the foregoing technical disclosure.

What is claimed is:

1. A non-transitory computer-readable storage medium having instructions encoded thereon, wherein the instructions when processed by a processing circuit perform the following:
   personalizing audio content for a user device based on an identifier, wherein the audio content is a dialogue track played during a movie;
   automatically providing the personalized audio content to the user device; and
   changing the personalized audio content when the user device leaves a room displaying the movie.

2. The non-transitory computer-readable storage medium of claim 1, wherein the identifier is based on demographic information about a user.

3. The non-transitory computer-readable storage medium of claim 1, wherein the personalized audio content comprises at least one of: an alternate or additional dialogue, an alternate or additional sound effect, an additional musical accompaniment, and one or more advertisements or offers.

4. The non-transitory computer-readable storage medium of claim 1, further comprising instructions to perform:
   personalizing the audio content for a different user device based on a different identifier, wherein the personalized audio content for the user device is different from the personalized audio content for the different user device; and
   providing the personalized audio content to the different user device.

5. The non-transitory computer-readable storage medium of claim 1, wherein the personalized audio content is based on a location in a room.

6. The non-transitory computer-readable storage medium of claim 1, wherein the personalized audio content is based on a type of the user device.

7. The non-transitory computer-readable storage medium of claim 1, wherein the changed personalized audio content includes audio content that is different from the personalized audio content that would be provided to the user device if the user device did not leave the room displaying the movie.

8. The non-transitory computer-readable storage medium of claim 1, wherein the personalized audio content is based on a group to which a user of the user device belongs.

9. The non-transitory computer-readable storage medium of claim 8, further comprising instructions to perform:
   personalizing the audio content for a different user device based on a different identifier, wherein the personalized audio content for the user device is different from the personalized audio content for the different user device; and
   providing the personalized audio content to the different user device;
   wherein the personalized audio content for the different user device is based on a different group to which a different user of the different user device belongs.

10. The non-transitory computer-readable storage medium of claim 8, wherein members of the group each receive the personalized audio content through their respective user devices, the personalized audio content being the same for each of the members.

11. The non-transitory computer-readable storage medium of claim 1, wherein the identifier is based on a ticket purchase.

12. The non-transitory computer-readable storage medium of claim 1, wherein the identifier is based on an identity of the user device.

13. The non-transitory computer-readable storage medium of claim 1, wherein the identifier is based on facial recognition.

14. The non-transitory computer-readable storage medium of claim 1, further comprising instructions to perform:
   storing information about a user or a user device to a database.

15. A computing device for providing audio content to a user device in a movie theater, the computing device comprising:
   a processor configured to:
   personalize the audio content for the user device based on an identifier; and
   provide the personalized audio content to the user device when the user device leaves a room in the movie theater displaying a movie, wherein the personalized audio content includes an audio synopsis of portions of the movie missed while the user device is not in the room displaying the movie.

16. The computing device of claim 15, wherein the identifier is based on demographic information about the user.

17. The computing device of claim 15, wherein the personalized audio content accompanies the movie.

18. The computing device of claim 17, wherein the identifier is based on whether the user belongs to a social network.

19. The computing device of claim 18, wherein the personalized audio content comprises audio commentary created by members of the social network.

20. The computing device of claim 19, wherein the processor is further configured to delay delivery of the audio commentary to align the commentary with a scene of the movie.

21. The computing device of claim 17, wherein the personalized audio content comprises, at least one of: an alternate or additional dialogue, an alternate or additional sound effect, an additional musical accompaniment, and one or more advertisements or offers.

22. The computing device of claim 15, further comprising:
   a network interface for wirelessly providing the personalized audio content to the user device.

23. The computing device of claim 15, the processor further configured to:
   personalize the audio content for a different user device based on a different identifier, wherein the personalized audio content for the user device is different from the personalized audio content for the different user device; and
   provide the personalized audio content to the different user device.

24. The computing device of claim 15, wherein the personalized audio content is based on a location in the movie theater.

25. The computing device of claim 15, wherein the personalized audio content is based on a group to which the user of the user device belongs.

26. The computing device of claim 25, the processor further configured to:
   personalize the audio content for a different user device based on a different identifier, wherein the personalized audio content for the user device is different from the personalized audio content for the different user device; and
   provide the personalized audio content to the different user device;
   wherein the personalized audio content for the different user device is based on a different group to which a different user of the different user device belongs.

27. The computing device of claim 25, wherein members of the group each receive the personalized audio content through their respective user devices, the personalized audio content being the same for each of the members.

28. The computing device of claim 15, wherein the identifier is based on a ticket purchase.

29. The computing device of claim 15, wherein the identifier is based on an identity of the user device.

30. The computing device of claim 15, wherein the identifier is based on facial recognition.

31. The computing device of claim 15, further comprising:
a storage medium;
wherein the processor is further configured to:
store, in the storage medium, information about the user or the user device to a database.

32. The computing device of claim 15, wherein the personalized audio content is provided automatically to the user device.

33. A user device for receiving audio content in a movie theater from a computing device, the user device comprising:
a processor configured to:
transmit an identifier to the computing device; and
receive personalized audio content from the computing device based on the identifier and based on a location of the user device after the user device leaves a room in the movie theater displaying a movie, wherein the location of the user device includes at least one of a lobby area, a lavatory, and a concession stand.

34. The user device of claim 33, wherein the personalized audio content accompanies a movie.

35. The user device of claim 34, wherein the identifier is based on whether the user belongs to a social network.

36. The user device of claim 35, wherein the personalized audio content comprises audio commentary created by members of the social network.

37. The user device of claim 36, wherein the processor is further configured to delay delivery of the audio commentary to align the commentary with a scene of the movie.

38. The user device of claim 33, wherein the personalized audio content comprises, at least one of: an alternate or additional dialogue, an alternate or additional sound effect, an additional musical accompaniment, and one or more advertisements or offers.

39. The user device of claim 33, further comprising:
a network interface for wirelessly receiving the personalized audio content from the computing device.

40. The user device of claim 33, further comprising:
at least one speaker;
wherein the processor provides the personalized audio content to the user through the at least one speaker.

41. The user device of claim 33, wherein the personalized audio content is based on a location in the movie theater of the user device.

42. The user device of claim 33, wherein the personalized audio content is based on a type of the user device.

43. The user device of claim 33, wherein the personalized audio content is based on a group to which the user of the user device belongs.

44. The user device of claim 33, wherein the identifier is based on a ticket purchase.

45. The user device of claim 33, wherein the identifier is based on an identity of the user device.

* * * * *